(12) United States Patent
Ogisu et al.

(10) Patent No.: US 6,655,218 B1
(45) Date of Patent: Dec. 2, 2003

(54) COMPOSITE MATERIAL AND METHOD OF CONTROLLING DAMAGE THERETO AND DAMAGE SENSOR

(75) Inventors: Toshimichi Ogisu, Tokyo-To (JP); Masato Nomura, Tokyo-To (JP); Norio Ando, Tokyo-To (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/579,806

(22) Filed: May 26, 2000

(30) Foreign Application Priority Data

| May 28, 1999 | (JP) | ............................................ 11-149721 |
| Dec. 6, 1999 | (JP) | ............................................ 11-345917 |
| Apr. 14, 2000 | (JP) | ............................................ 2000-113605 |

(51) Int. Cl.$^7$ ................................................. G01B 7/16
(52) U.S. Cl. ............................................................. 73/768
(58) Field of Search ............................ 73/762, 763, 767, 73/768, 774, 775, 776, 794, 795

(56) References Cited

U.S. PATENT DOCUMENTS

| 5,114,104 A | * | 5/1992 | Cincotta et al. ............ 114/152 |
| 5,132,166 A | * | 7/1992 | Adams et al. ............... 156/176 |
| 5,549,370 A | * | 8/1996 | Folsom ........................ 267/149 |
| 5,558,304 A | * | 9/1996 | Adams .................... 244/134 A |
| 5,611,874 A | * | 3/1997 | Zadno-Azizi et al. ........ 148/402 |
| 5,736,463 A | * | 4/1998 | Sato ........................ 156/345.12 |
| 5,804,276 A | * | 9/1998 | Jacobs et al. ................ 428/110 |
| 6,159,165 A | * | 12/2000 | Ferrera et al. ............... 600/585 |

OTHER PUBLICATIONS

Patent Abstracts of Japan No. 07048637 A, Feb. 21, 1995; and JP 7–48637, Feb. 21, 1995, Japanese Unexamined–Patent Publication.
Patent Abstracts of Japan No. 06212018 A, Aug. 2, 1994; and JP 6–212018, Aug. 2, 1994, Japanese Unexamined–Patent Publication.
Patent Abstracts of Japan No. 08015208 A, Jan. 19, 1996; and JP 8–15208, Jan. 19, 1996, Japanese Unexamined–Patent Publication.

* cited by examiner

*Primary Examiner*—Max Noori
(74) *Attorney, Agent, or Firm*—Martin A. Farber

(57) ABSTRACT

A composite material has a laminated structure of fiber-reinforced resin layers and films of a shape-memory alloy. A predetermined strain has been applied to each film. A damage sensor has a film of an alloy of nickel and titanium. An electric circuit is bonded to the film, and strain gages are connected to the electric circuit. The damage sensor can be laminated to the resin layers in place of the film of the shape-memory alloy. Damage to the composite material is suppressed as follows: A current is applied to the films of the shape-memory alloy, to monitor change in electric resistance of the films. The damage is located in response to the change in electric resistance. Another current is applied to a film of the shape-memory alloy for which the change is larger than the other films to generate heat for deforming the film to generate shrinking stress or shear stress to the damage.

7 Claims, 6 Drawing Sheets

COMPOSITE MATERIAL AND METHOD OF CONTROLLING DAMAGE THERETO AND DAMAGE SENSOR

BACKGROUND OF THE INVENTION

1. Field of the Invention

The present invention relates to composite materials and a method of controlling damage to composite materials, and a damage sensor for detecting damage to composite materials.

2. Description of Prior Art

Composite materials are used for next-generation aircraft, satellites, space stations, skyscrapers, public infractructures, high-speed vehicles, and so on.

Design tolerance for composite materials is set about one-fourth of the strength which the materials have by nature because the materials are prone to damage due to impact loads.

There are new types of composite materials to raise design tolerance for safety improvement. A material that suppresses damage or a sensor that detects an impact load and damage, is embedded in the composite materials.

Japanese Unexamined-Patent Publication No. 1994(6)-212018 discloses a polymer-based advanced composite material. The material has at least one type of shape-memory alloys arranged over or inside the raw material of the composite material. Each shape-memory alloy has been deformed at a temperature equal to or lower than a specific temperature at which reverse transformation completes.

Japanese Unexamined-Patent Publication No. 1995(7)-48637 discloses a metal-based composite material. The material has at least one type of shape-memory alloys mixed or arranged inside the raw material of the composite material. Each shape-memory alloy exhibits thermoelastic transformation.

Japanese Unexamined-Patent Publication No. 1996(8)-15208 discloses a damage detection system for composite materials. A fine wire of NiTi-shape-memory alloy is embedded in laminated composite materials. A current flows through the fine wire to detect change in electrical resistance of the fine wire, which will occur when composite materials crack, for example.

The shape-memory alloys disclosed by the Publication Nos. 1994(6)-212018 and 1995(7)-48637 may become foreign substances to composite materials after embedded to cause false defects, thus weakening the strength of the materials.

These publications disclose usage of NiTi-shape-memory alloys as an actuator to suppress development of cracks on composite materials. Also taught is a strain gage and a piezoelectric transducer that can be used as a damage sensor. However, there is no disclosure of how to use these sensors.

The damage detection system disclosed by the Publication No. 1996(8)-15208 uses different materials for damage detection and suppression. A shrinkage uniformly occurring to a fine wire of shape-memory alloy suppresses transverse cracks.

This system, however, hardly detects change in the characteristics of the fine wire when the change becomes small as the wire lengthens, and also hardly locates the position of damage to the composite material, which causes the change.

Moreover, this system cannot protect composite materials from delamination which tends to occur due to impact loads when the materials have a low design tolerance.

SUMMARY OF THE INVENTION

In view of the foregoing disadvantages, a purpose of the present invention is to provide a composite material having shape-memory alloys, for suppressing damage to the material, and a method thereof.

Another purpose of the present invention is to provide a damage sensor for detecting damage to a composite material, and a method of fabricating the damage sensor.

The present invention provides a composite material. The composite material includes at least two fiber-reinforced resin layers, and at least one film of a shape-memory alloy provided between the layers. A predetermined strain has been applied to the film.

Furthermore, the present invention provides a damage sensor. The damage sensor includes a film of an alloy of nickel and titanium. At least one electric circuit is bonded to the film, and at least one strain gage is connected to the electric circuit.

Moreover, the present invention provides a composite material. The composite material includes at least two fiber-reinforced resin layers, and a damage sensor provided between the layers. The damage sensor has a film of an alloy of nickel and titanium. A predetermined strain has been applied to the film. A least one electric circuit is bonded to the film, and at least one strain gage is connected to the electric circuit.

Still furthermore, the present invention provides a method of controlling damage to a composite material. A current is applied to films of a shape-memory alloy provided between fiber-reinforced resin layers of the composite material. A predetermined strain has been applied to each film. Change in electric resistance of the films is monitored by the current. Damage to the composite material is located in response to the change in electric resistance. Another current is applied to a film of the shape-memory alloy for which the change is larger than the other films to generate heat for deforming the film to generate pressure or shear stress to the damage.

Moreover, the present invention provides a method of fabricating a damage sensor. A predetermined strain is applied to an NiTi-alloy film. The strain-applied NiTi-alloy film is soaked with an acidic aqueous solution to remove an oxide film that has coated the NiTi-alloy film. The oxide film-removed NiTi-film is coated with a protective film. A film of an electric circuit with strain gages is bonded to the protective film-coated NiTi-film.

DETAILED DESCRIPTION OF PREFERRED EMBODIMENTS

Preferred embodiments according to the present invention will be disclosed with reference to the attached drawings.

Figure 1:
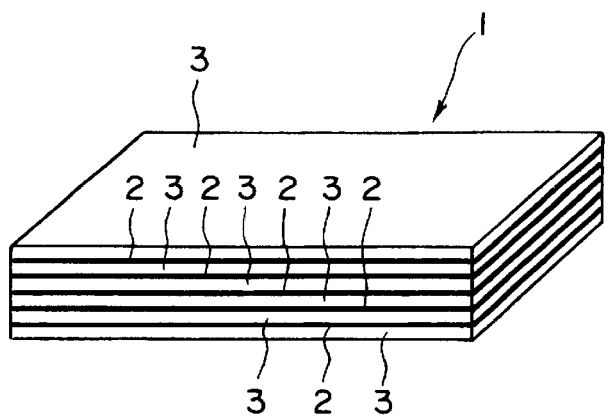
FIG. 1 shows a structure of a composite material according to the present invention.

FIG. 1 shows a structure of a panel 1 made of composite materials (called a composite panel hereinafter) according to the present invention.

As shown, thin films 2 of a shape-memory alloy and fiber-reinforced resin layers 3 are laminated to each other.

Each thin film 2 is made of a shape-memory alloy of nickel (Ni) and titanium (Ti) with about 0. 04 mm in thickness. Strain has been applied to each film at a room temperature, or a temperature equal to or lower than a transformation temperature before the films are laminated to the resin layer 3.

Figure 2:
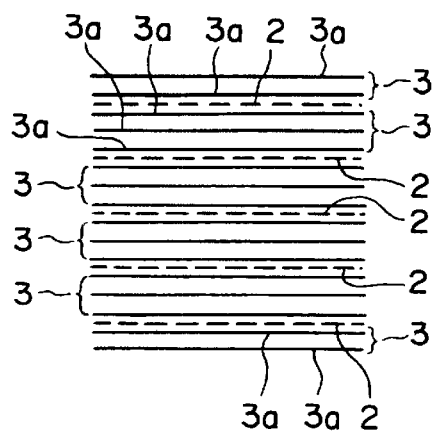
FIG. 2 illustrates a laminated structure of the composite material shown in FIG. 1.

Each resin layer 3 is made of fiber-reinforced resin films 3a laminated to each other, as shown in FIG. 2.

A shape-memory alloy is an alloy which returns to its original crystal phase when heated after transformation (a shape recovery function).

Figure 3:
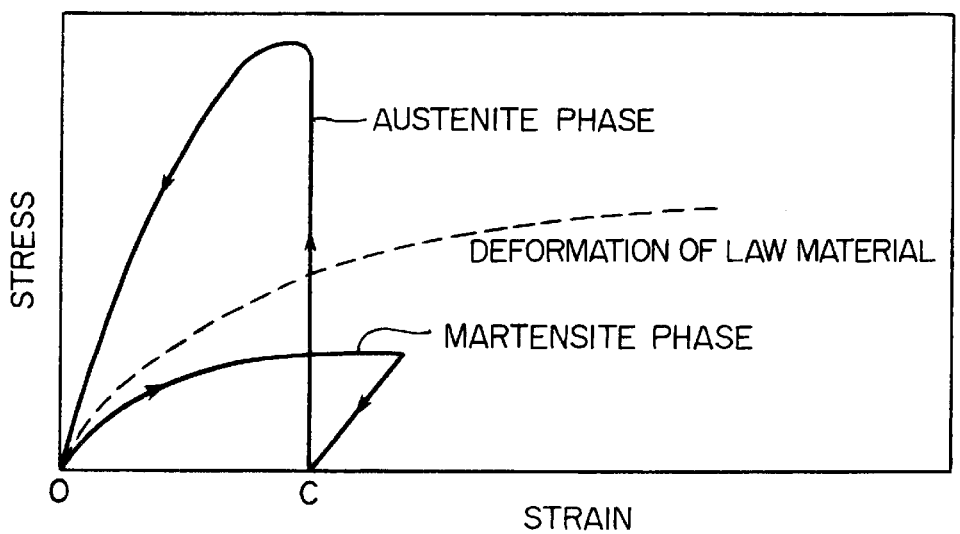
FIG. 3 is a graph representing the characteristics of a shape-memory alloy used in the present invention.

As shown in FIG. 3, a shape-memory alloy exhibits a martensite phase at a temperature equal to or lower than the temperature Mf at which martensite transformation completes, and an austenite phase at a temperature equal to or higher than the temperature Af at which austenite transformation completes.

As is apparent from FIG. 3, a shape-memory alloy is deformed at the martensite phase by the stress about a half to one-thirds than that for the austenite phase. The solidity of the shape-memory alloy increases two to three times as the temperature rises. Pre-application of strain to the shape-memory alloy to keep its transformation (deformation) offers a two to three-time strong recovery.

The composite panel 1 (FIG. 1) according to the present invention generates a shear stress to each layer of the composite material to suppress delamination.

This is achieved by keeping transformation of each thin film 2 of the shape-memory alloy at a temperature equal to or lower than a specific transformation point before laminating the film on each fiber-reinforced resin layer 3, and heating the thin film 2 at a temperature equal to or higher than the transformation point for another transformation.

The composite panel 1 is made of six fiber-reinforced resin layers 3 and two types of thin films 2 of the shape-memory alloy exhibiting different degree of strain at a room temperature.

More in detail, as shown in FIG. 2, the highest and lowest layers 3 are made of a lamination of two carbon fiber-reinforced resin films 3a; on the other hand, the middle layers 3 are made of a lamination of three carbon fiber-reinforced resin films 3a; and two types of thin films 2 of the shape-memory alloy exhibiting different degree of strain at the room temperature are alternately laminated to the layers 3.

Not only two but also three types of thin films of the shape-memory alloy exhibiting different degree of strain at the room temperature can be alternately laminated to the layers 3. It is preferable that tape-like thin films 2 of the shape-memory alloy are arranged on each layer 3, without being in touch with each other.

Disclosed next is a process of fabricating the composite panel 1.

Figure 4:
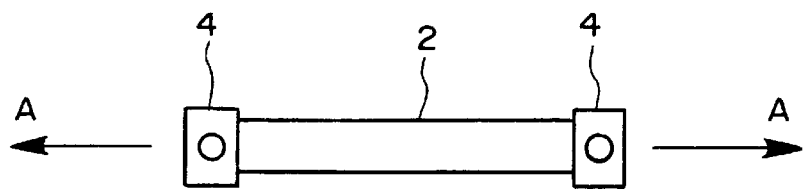
FIG. 4 illustrates the application of strain to a thin film of the shape-memory alloy of the composite material shown in FIG. 1.

Each thin film 2 of shape-memory alloy is held by clips 4 at its both ends, as shown in FIG. 4. The thin film is pulled in the directions of arrows A at the room temperature. Then, strain is given to the thin film at a temperature equal to or lower than a transformation point.

Figure 5:
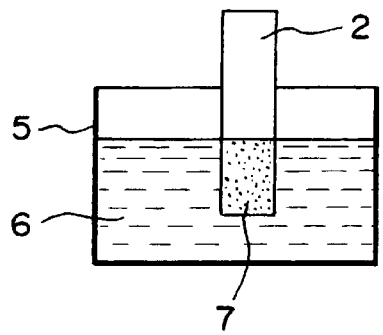
FIG. 5 illustrates a process of fabricating the thin film of the shape-memory alloy.

The surface of the thin film 2 is then made rough by surface finishing, as shown in FIG. 5. In detail, the thin film 2 is put into a container 5 and soaked with an agent 6, such as, nitric acid or hydroflouric acid, for forming a rough face 7. The surface finishing should be conducted at a temperature below the transformation temperature which is 60 to 70° C. for the thin film 2 of the shape-memory alloy. This process can be conducted by sputtering or sol-gel process.

Next, a carbon fiber-reinforced prepreg is cut into several prepregs (carbon fiber-reinforced resin films) 3a with a predetermined size. The prepregs 3a and the thin films 2 are laminated to each other, as shown in FIG. 2, so that strain has been kept for each film 2 by means of a strain keeper (not shown). The rough face made on each film 2 by chemical or physical process gives sufficient adhesion to the boundary face between each prepreg 3a and film 2.

FIG. 2 shows 16 ply of the prepregs 3a (two ply at the highest and lowest layers, and three ply for each thin film 2) and five ply of the thin films 2.

The thin films 2 generate shear stress to the laminated structure (FIG. 2) to suppress a cracking-development allowable stress of 5 Kgf/mm$^2$.

Figure 6:
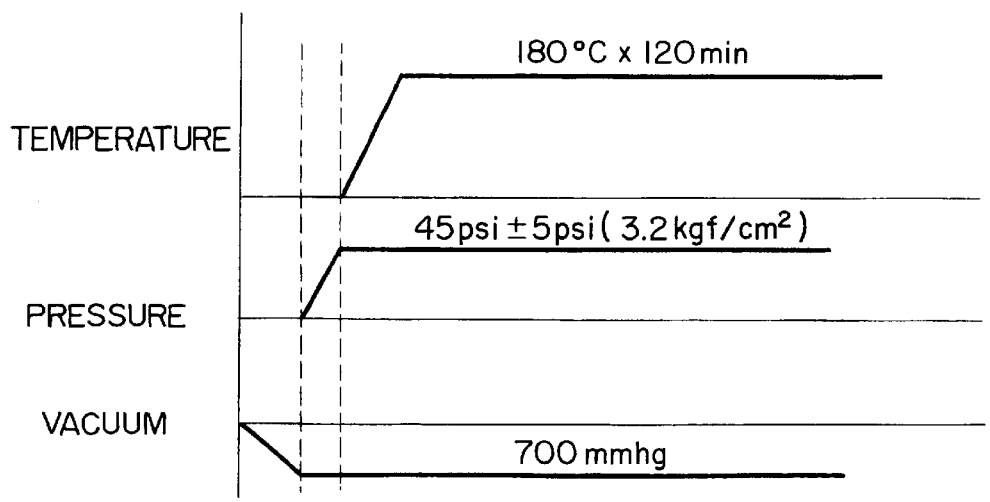
FIG. 6 explains another process of fabricating the composite material shown in FIG. 1.

The laminated structure is then hardened for 120 minutes at 180° C., about 700 mmhg under vacuum, and 3.2 Kgf/mm$^2$ of pressure, as shown in FIG. 6, to form the composite panel 1.

Disclosed next is a method of damage control.

A shape-memory alloy is a metal, so that its electrical resistance is decided according to the cross sectional area. Thus, a constant small current always flowing through a shape-memory alloy will change the electrical resistance when the alloy cracks inside, to cause strain locally. The damage to the inside of the alloy can be detected by monitoring the output voltage.

Output voltage variation according to the degree of damage can be stored on computer to be used as reference data for damage detection.

Figure 7:
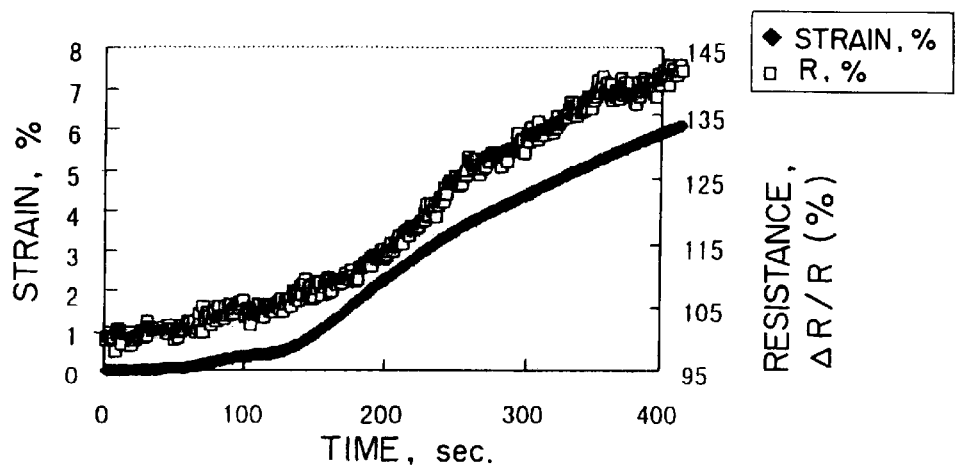
FIG. 7 is graph representing the relationship between the strain to the shape-memory alloy and electrical resistance.

FIG. 7 illustrates the relationship between the strain to shape-memory alloy and the electrical resistance.

The type, location, and size or degree of damage to composite materials can be detected on the basis of the pre-stored relationship between the type (transverse cracks, delamination, etc.), location, and degree of damage and electrical resistance, and the distribution of electrical resistance.

The type, location, and degree of damage to composite materials can be displayed as 3-D images.

Figure 8:
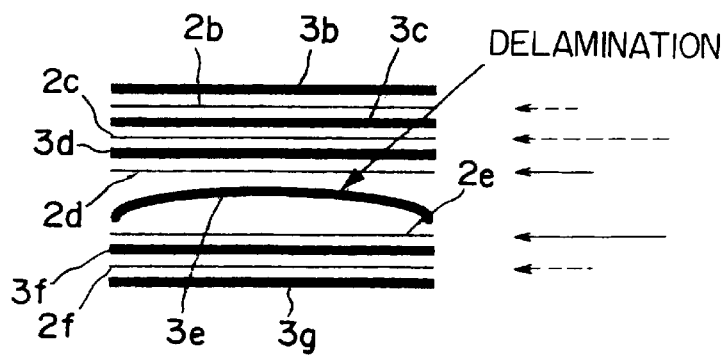
FIG. 8 illustrates how damage to the composite material shown in FIG. 1 is suppressed.

When a prepreg 3e is delaminated, for example, as shown in FIG. 8, the stress pre-applied to the fiber-reinforced resin film 3e and the stress caused by the damage become out of balance. This imbalance of stress is transformed into strain to the thin films 2 of the shape-memory alloy. The thin films are then deformed to generate change in electrical resistance. The damaged position of the composite panel can be located by detecting which of the thin films for which the electrical resistance has been varying.

On location of damage, a current is flown through the thin film 2 that corresponds to the damaged position, to heat the film over the transformation temperature. This heating process causes the thin film 2 to be deformed to apply pressure to the damaged portion of the composite material for suppressing the damage.

The composite panel shown in FIG. 8 is made of fiber-reinforced resin films 3b to 3g and thin films 3b to 2f of shaped-memory alloy, laminated by turns.

Strain has been applied to the thin films 3b to 2f, such as, relatively large strain to the films 2c and 2e; on the other hand, relatively small strain to the highest and lowest films 3b and 2f, and the middle film 2d.

When the fiber-reinforced resin film 3e is delaminated, as illustrated, there will be a big change in electrical resistance of the thin films 2d and 2e located over and under the resin film 3e, and also some changes in electrical resistance of the other thin films.

It depends on the degree of damage, however, the electrical resistance of the thin films 2d and 2e exhibit abrupt change. A current is flown to the thin films 2d and 2e for suppressing the delamination. The small and large strain that have been applied to the thin films 2d and 2e, respectively, cause the resin film 3e to bend upwards, which will be pressed by the upper films to suppress further delamination.

Disclosed next is a damage sensor according to the present invention.

Figure 9:
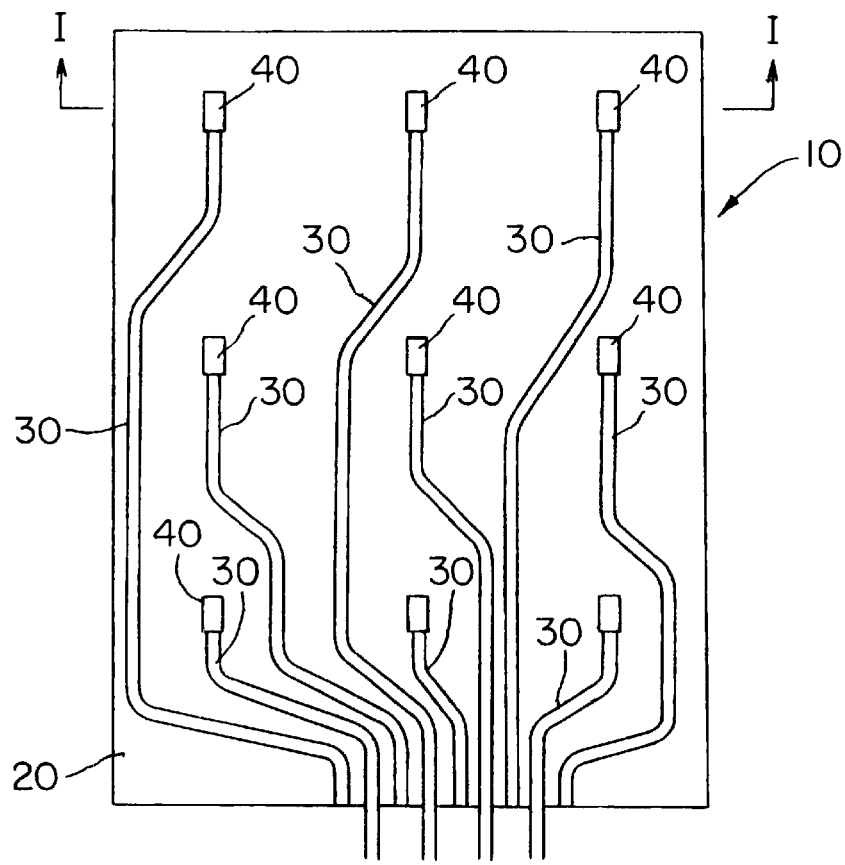
FIG. 9 illustrates a structure of a damage sensor according to the present invention.

As shown in FIG. 9, a damage sensor 10 is constituted by an NiTi-alloy film 20 processed by surface finishing for high adhesion, electric circuits 30 being bonded on the film surface, and strain gages 40 being connected to the circuits 30.

The damage sensor 10 is fabricated as follows:

Both ends of the NiTi-alloy film 20 are pulled like shown in FIG. 4. This gives the film 20 a predetermined strain.

Next, the NiTi-alloy film 20 is subjected to surface finishing as follows:

The NiTi-alloy film 20 is soaked with an aqueous solution of a mixture of nitric acid and hydroflouric acid at a room temperature, to remove an oxide film that has coated the NiTi-alloy film, and then subjected to anodic oxidation with an aqueous solution of sodium hydroxide, to form an anodic oxide film (protective film) on the NiTi-alloy film. An experiment teaches that the anodic oxide film improves the adhesion of the NiTi-alloy film.

The oxide film removal is preferably conducted by soaking the NiTi-alloy film with an aqueous solution of nitric acid of 10 to 15%-consentration and hydroflouric acid of 3%-consentration, for 3 to 5 minutes at a room temperature.

The anodic oxidation is preferably conducted by soaking the NiTi-alloy film with a liquid electrolyte of NaOH of 10 to 15%-consentration heated to 10 to 20° C., at a voltage of 10 to 20 V for 30 to 60 seconds.

After the oxide film is removed, instead of the anodic oxidation, the NiTi-alloy film can be coated with titanium by ion plating, for example, and then coated with a chemical conversion film (protective film) by chemical conversion coating.

Figure 10:
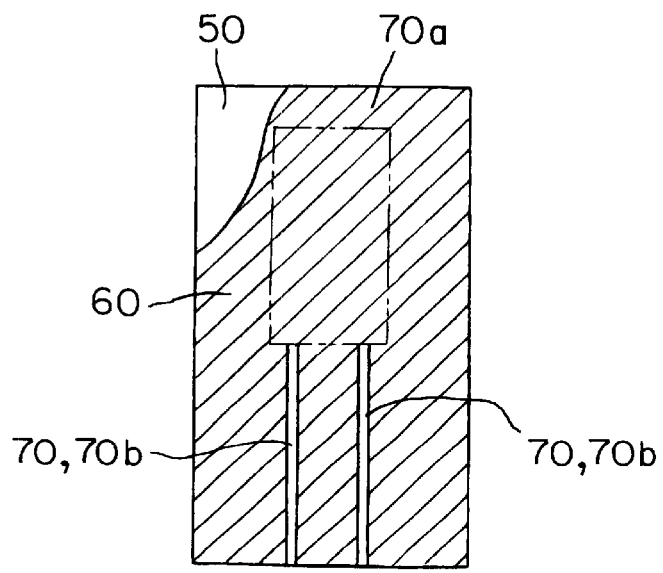
FIG. 10 explains a method of fabricating an electric circuit of the damage sensor shown in FIG. 9.

The electric circuits 30 are formed, as shown in FIG. 10 in which one circuit is illustrated an enlarged view.

In FIG. 10, a circuit for taking signals from a strain gage is drawn on a copper film 60 bonded to a resin sheet 50, by means of a resin ink 70. The copper film 60 is etched by an aqueous solution of ferric chloride, to be removed from the sheet 50 except the lines drawn by the resin ink 70. A strain gage will be fixed on an area 70a. The lines drawn by the resin ink 70 are lead lines 70b.

The electric circuits 30 are then bonded to the NiTi-alloy film 20, one by one, as shown in FIG. 9.

The interval between strain gages 40 is decided by an experiment or computer simulation so that the strain gages 40 can detect a certain size of damage.

According to an experiment, the interval between the strain gages 40 is preferably 50 to 100 cm. The strain gages 40 are preferably arranged in the same direction, as shown in FIG. 9.

Figure 11:
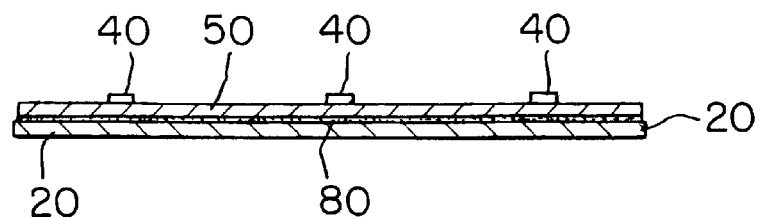
FIG. 11 is a cross section taken on line I—I in FIG. 9.

Furthermore, as shown in FIG. 11, the strain gages 40 (circuits 30) formed on the resin sheet 50 are bonded to the NiTi-alloy film 20 via an adhesion bond layer 80, to form a strain detection circuit on the film 20.

The resin for the resin sheet 50, adhesion layer 80, and another resin sheet (not shown) to cover the strain gages 40, is preferably the same as or the same type of the resin for the raw material of the composite material.

Copper film portion that remains as the circuits 30 after etching should be fine enough so as not to affect the adhesion strength of the NiTi-alloy film 20 and the composite material to which the film is bonded.

Figure 12:
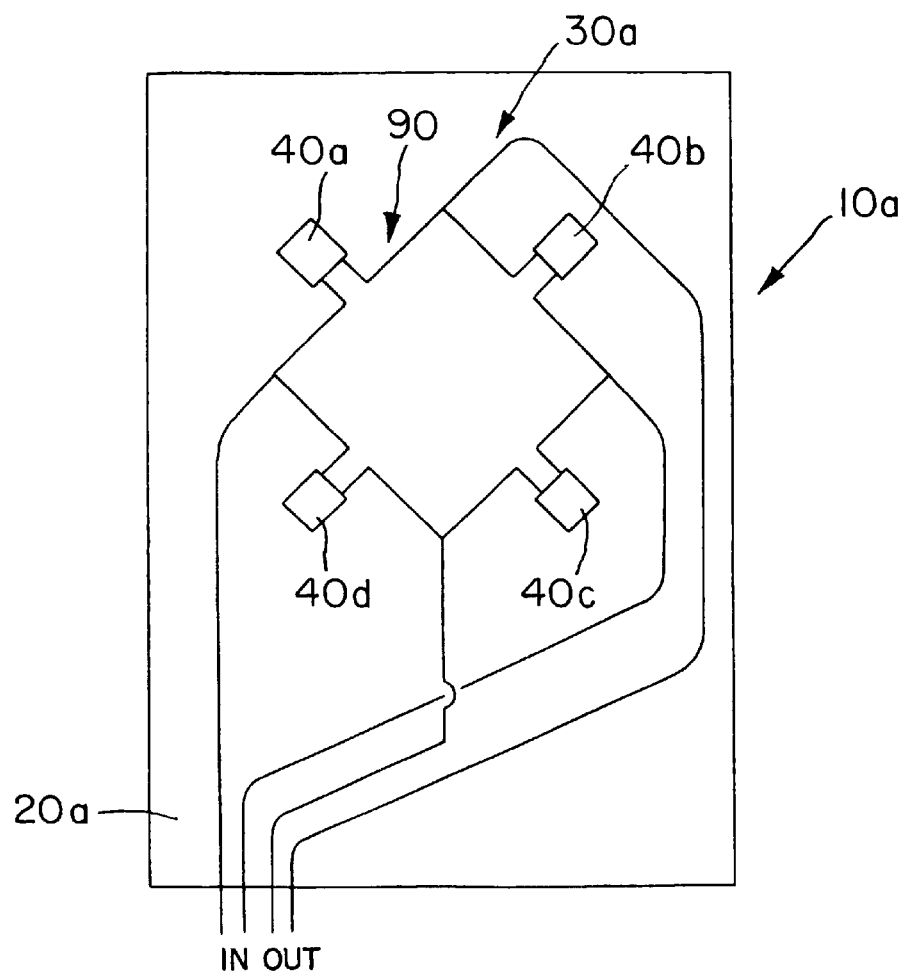
FIG. 12 shows another structure of a damage sensor according to the present invention.

Another embodiment of a damage sensor according to the present invention is shown in FIG. 12.

A damage sensor 10a is constituted by an Ni—Ti—alloy film 20a processed by surface finishing for high adhesion, an electric circuit 30a and strain gages 40a, 40b, 40c and 40d connected to the circuit 30a.

The strain gages 40a to 40d are connected to each other to form a Wheatstone bridge 90. Each gage is provided at 45 degrees in a direction of stress. Moreover, the gages 40a and 40b, 40b and 40c, 40c and 40d, and 40d and 40a are arranged in the direction in which the two adjacent gages are orthogonal to each other.

The output voltage of the Wheatstone bridge 90 is obtained from strain E1, E2, E3 and E4 detected by the strain gages 40a, 40b, 40c and 40d, respectively.

In other words, the Wheatstone bridge 90 generates a voltage proportional to (E1−E2+E3−E4), to locate the damaged position according to the positive or negative sign of the output voltage.

It can be detected that, for example, when a positive voltage is output, a portion close to the gage 40a or 40c has cracked, on the other hand, when a negative voltage is output, a portion close to the gage 40b or 40d has cracked.

The damage sensor 10a can be fabricated in the same way as for the damage sensor 10, except the Wheatstone bridge 90, and hence the description of a method of fabricating the sensor 10a is omitted for brevity.

Figure 13:
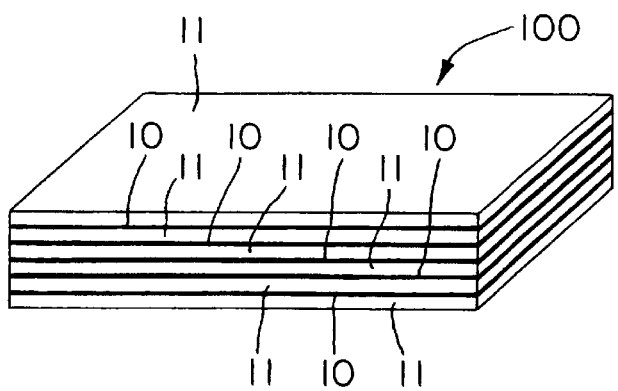
FIG. 13 shows another structure of a composite material according to the present invention.

Illustrated by FIG. 13 is a composite panel 100 including the damage sensor according to the present invention.

As shown, fiber-reinforced resin films 11 and the damage sensors 10 are laminated to each other, to form the composite panel 100. The damage sensors 10a can be used in place of the sensor 10.

Each damage sensor 10 has been given strain at a room temperature before being provided between the fiber-reinforced resin films 11.

Each film 11 is made of a lamination of prepregs of fiber-reinforced resin, and heated to be hardened under the condition that the NiTi-alloy film 20 has been processed not to shrink. This heat can be used to harden the adhesion bond layer 80 to bond the film 20 and the resin sheet 50, as shown in FIG. 11.

The NiTi-alloy film 20 of each damage sensor 10 also has the characteristics discussed with reference to FIG. 3.

Based on the characteristics, each damage sensor 10 has been deformed at a temperature equal to or lower than a transformation point before being provided between the fiber-reinforced resin films 11. The NiTi-alloy film 20 of each damage sensor 10 will be heated over the transformation point for another deformation to generate a shear stress to each layer of the composite panel 100 for suppressing delamination.

Figure 14:
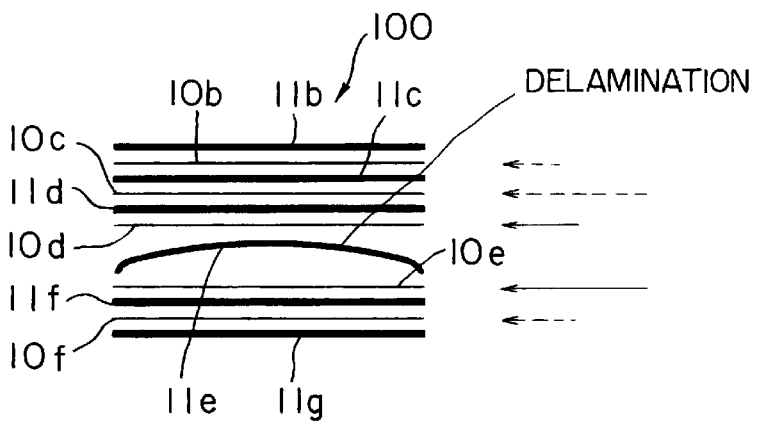
FIG. 14 illustrates how damage to the composite material shown in FIG. 13 is suppressed.

As shown in FIG. 14, the composite panel 100 is made of six fiber-reinforced resin films 11b, 11c, 11d, 11e, 11f and 11g, and five damage sensor 10b, 10c, 11d, 11e and 11f, laminated by turns.

The highest and lowest films 11b and 11g are made of a lamination of two carbon fiber-reinforced resin films; on the other hand, the middle films 11c, 11d, 11e and 11f are made of a lamination of three carbon fiber-reinforced resin films.

Disclosed next is a method of damage control for the composite panel 100.

The damage sensor 10b to 11f have a structure shown in FIG. 9.

A constant small current always flowing through the NiTi-alloy film 20 will change the electrical resistance thereof when the composite material cracks inside, to cause a local strain on the film 20.

In detail, when the fiber-reinforced resin film 11e is delaminated, for example, as shown in FIG. 14, the stress pre-applied to the film 11e and the stress caused by damage become out of balance. This imbalance of stress is transformed into to strain to the NiTi-alloy film 20 of the damage sensor 10d and 10e. The film 20 is then deformed to generate change in electrical resistance. Which of the fiber-reinforced resin films 11b to 11g has been damaged can be located by detecting which of the film 20 of the sensors on which the electrical resistance has been varying.

When the fiber-reinforced resin film 11e is delaminated, as illustrated, there will be a big change in electrical resistance of the films 20 of the sensor 10d and 11e located over and under the resin film 11e, and also some change in electrical resistance of the films 20 of the other sensors.

It depends on the degree of damage, however, the electrical resistance of the films 20 of the sensors 10d and 10e exhibit abrupt change. A current is flown to the films 20 of the sensors 10d and 10e for suppressing the delamination.

A method of locating damage to the composite panel 100 (FIG. 13) is disclosed in detail.

A several strain patterns of relative values that exhibit change in strain detected by several strain gages according to the positions of damage are stored as reference patterns in an instrument of measuring and analyzing strain detected by strain gages.

The strain detected by the strain gages of the damage sensors 10b to 10f are transformed into relative values to obtain strain patterns. The strain patterns are then compared with the reference patterns, to locate the damaged position the composite panel 100.

For example, when the fibers of any fiber-reinforced resin film (11b to 11g) are cut in a direction orthogonal to the direction of the stress of transverse crack to cause crack, the strain detected by the strain gages 40 that surround the crack increases. The degree of the damage is detected according to the strength of detected strain.

When delamination occurs, the strain detected by the strain gages surrounding the delaminated portion increases, while the strain detected by other strain gages decreases. And hence, this delamination is distinguished with damage in a direction orthogonal to the direction of the stress of transverse crack. The delamination can be detected for its location and degree in the same way as for the crack made in a direction orthogonal to the direction of the stress of transverse crack.

A strain contour line map can be used as strain patterns. In detail, strain of several points on the composite panel 100 are detected. The maximum strain value and the corresponding point are detected. The strain value on each point is divided by the maximum strain value to obtain relative values (values relative to the maximum value). The relative values are stored in the strain measuring and analyzing instrument.

A strain contour line map is then obtained by using the relative values. The strain contour line map is compared with a reference contour line map that has been obtained by simulation and stored in the instrument, to locate an exact location of damage. Or, the center of the strain contour line map obtained from the measured strain can be detected as the location of damage.

A method of estimating the location of damage is disclosed.

For example, the location of damage on plane is estimated by using three strain gages aligned in the same direction Dir. A quadratic curve is obtained by the detected stain to find out the maximum strain point. Obtained next is a line Y orthogonal to the direction Dir. Another quadratic curve is obtained by the detected stain in the direction orthogonal to the direction Dir to find out the maximum strain point. A line X that passes this maximum point and is parallel to the direction Dir, is obtained. The intersection point of the lines X and Y is estimated as the damaged position.

The location of a transverse crack is easily estimated because the strain values of strain gages located between the crack abruptly increase.

There are many cases where an exact location and degree of damage are not required. For such cases, the location of damage can be estimated by the strain gage that outputs the maximum strain, and the degree of damage can be estimated according to the sum of strain values detected on the periphery of the damage.

Like the damage control method for the composite panel 1 shown in FIG. 1, the output voltage variation from the damage sensor can be stored on computer, to be used as reference data for damage detection.

When there is a change in a strain pattern for no damage, damage can be detected by a strain gage that generates an output larger than the others, and the portion close to the strain gage or surrounded by this gage and other gages can be estimated as the damaged position.

As disclosed above, the type and location and degree of damage can be estimated according to the relationship between the electrical resistance and the type of damage, such as, transverse crack and delamination, location and degree of damage and the distribution of the electric resistance.

Figure 15:
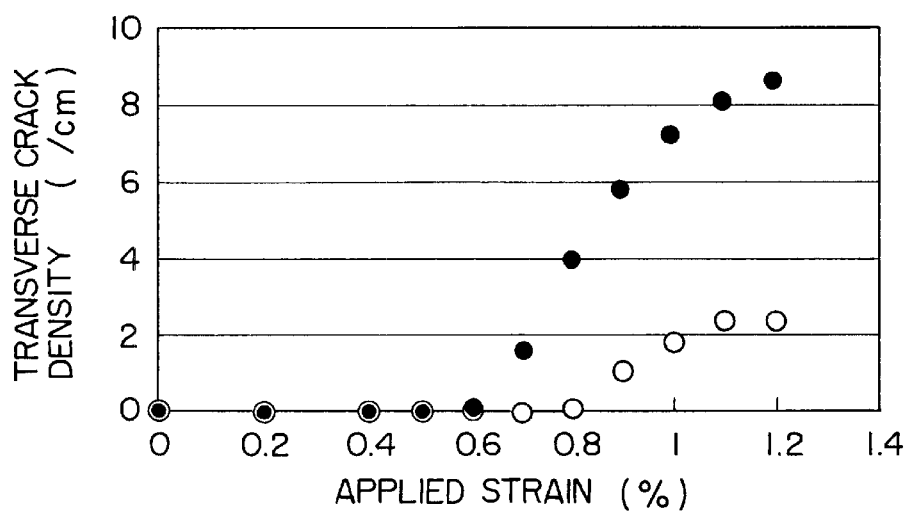
FIG. 15 is graph teaching advantages of the composite material according to the present invention.

FIG. 15 teaches advantages of the composite material having the shape-memory alloy according to the present invention.

The horizontal and vertical axes of the graph represent strain (%) and transverse crack density (/cm), respectively. The marks "○" and "●" exhibit the composite material having the shape-memory alloy of the invention and a composite material without shape-memory alloy.

As is apparent from FIG. 15, the generation of transverse crack for the composite material having the shape-memory alloy was suppressed under the condition that the strain of 0.4% had been applied to the alloy.

As disclosed above, according to the present invention, the composite material has films of the shape-memory alloy given different strain at a room temperature and provided between fiber-reinforced resin layers. A shape recovery function of the shape-memory alloy is used to suppress damage, thus achieving recovery of the damaged portion.

The damage control method for composite material according to the present invention monitors change in electric resistance of the films of shape-memory alloys to locate a damaged position, and applies a current to the film corresponding to the damaged position, which generates heat for deforming the corresponding film to generate pressure or shear stress, thus achieving control or suppression of damage to the composite material.

Furthermore, according to the present invention, the damage sensor has strain gages on electric circuits bonded to a film of NiTi-shape-memory alloy, thus achieving detection of damage to a composite material.

The damage sensor is fabricated by removing an oxide film from a strain-applied NiTi-alloy film and oxidizing the NiTi-alloy by anodic oxidation to form an anodic oxide film on the NiTi-alloy film, thus improving the adhesion of the NiTi-alloy film to the film of electric circuit with strain gages.

The damage sensor is fabricated, instead of anodic oxidation, by coating the oxide film-removed NiTi-alloy film with titanium and a chemical conversion film by chemical conversion coating. This process also improves the adhesion of the NiTi-alloy film to the film of electric circuit with strain gages.

What is claimed is:

1. A Composite material comprising:
   a plurality of fiber-reinforced resin layers;
   a plurality of films of an alloy of nickel and titanium; and
   a damage sensor provided between the layers, the sensor having:
   at least one electric circuit bonded to the films; and
   at least one strain gage connected to the electric circuit, wherein the layers and the films are laminated by turns, the films are laminated on an upper side and on a lower side of at least one of the layers, and wherein the films of the upper and the lower sides are provided with different strains from each other.

2. The composite material according to claim 1, wherein said strain gage includes a plurality of strain gages connected to the electric circuit and arranged in a predetermined same direction with a predetermined interval.

3. The composite material according to claim 1, wherein the electric circuit comprises a Wheatstone bridge to which a plurality of strain gages are connected.

4. The composite material according to claim 3, wherein adjacent strain gages are arranged to be orthogonal to each other.

5. The composite material according to claim 1, wherein the film includes two types of films having been applied with different strains.

6. A composite material comprising:
   a plurality of fiber-reinforced resin layers;
   a plurality of films of a shape-memory alloy, the layers and the films being laminated by turns, the least one of the layers, wherein the films of the upper and the lower sides are provided with different strains from each other; and
   wherein the layers are six-ply fiber-reinforced resin layers while the films are five-ply shape-memory alloy films, the films laminated on the uppermost side and the lowest side of the six-ply layers having been applied a first predetermined strain, the film laminated on a middle of the six-ply layers having been applied the first predetermined strain, the films laminated between the uppermost side and the middle, and between the lowest side and the middle of the six-ply layers having been applied a second predetermined strain different from the first predetermined strain.

7. The composite material according to claim 6, wherein the first strain is smaller than the second strain.

* * * * *